United States Patent [19]

Last

[11] 4,106,022
[45] Aug. 8, 1978

[54] RADIO POSITION-DETERMINING SYSTEM

[75] Inventor: James David Last, Llanfairfechan/Gorddinog, Wales

[73] Assignee: University College of North Wales, Bangor, Wales

[21] Appl. No.: 699,048

[22] Filed: Jun. 23, 1976

Related U.S. Application Data

[63] Continuation-in-part of Ser. No. 496,203, Aug. 9, 1974, abandoned, which is a continuation-in-part of Ser. No. 360,060, May 14, 1973, abandoned.

[30] Foreign Application Priority Data

May 15, 1972 [GB] United Kingdom ............... 22775/72

[51] Int. Cl.² ............................................... G01S 1/30
[52] U.S. Cl. ................................ 343/105 R; 343/103
[58] Field of Search ................. 343/103, 105, 112 TC

[56] References Cited

U.S. PATENT DOCUMENTS

| 3,471,856 | 10/1969 | Laughlin, Jr. et al. ..... 343/105 R X |
| 3,493,970 | 3/1970 | Knauth ................................. 343/103 |
| 3,711,856 | 1/1973 | Adrian et al. ............... 343/105 R X |
| 3,715,757 | 2/1973 | Toman ............................ 343/108 R |
| 3,774,215 | 11/1973 | Reed ........................... 343/105 R X |

Primary Examiner—Maynard R. Wilbur
Assistant Examiner—Richard E. Berger
Attorney, Agent, or Firm—Wenderoth, Lind & Ponack

[57] ABSTRACT

A relay system for relaying hyperbolic navigation signal information received at a mobile. The mobile has a simple relay transmitter and receives signals which are radiated from different navigation transmitters in turn on a single frequency $f_{rf}$. The received signals are heterodyned to a single audio frequency $f$ by mixing with a locally-generated or transmitted signal $f_o$. Phase errors are minimized by transmitting the information as phase changes of the single frequency $f$ signal in a single transmission channel.

18 Claims, 10 Drawing Figures

PURPLE SLAVE

RED SLAVE

MASTER STATION

RECEIVER

GREEN SLAVE 0.2F    8.2F+8F
0.8F    8.2F+9F
MOBILE

RADIO POSITION-DETERMINING SYSTEM

This application is a continuation-in-part to application Ser. No. 496,203 filed Aug. 9, 1974, now abandoned. Application Ser. No. 496,203 is a continuation-in-part to application Ser. No. 360,060 filed May 14, 1973, now abandoned.

The invention relates to a system for determining position by radio of a kind in which a mobile, for example a vessel, aircraft or land vehicle receives radio signals from two or more pairs of fixed transmitters. The radio signals have predetermined phase relationships and by determining the relative phases of the signals received from the different transmitters, the position of the mobile can be determined with reference to a pattern of hyperbolic iso-phase lines based on the transmitter positions. The most widely used system of this kind is the Decca Navigator System and the present invention is applicable to this system as well as to the Decca Hi-Fix and Sea-Fix Systems.

The receivers necessary for position determination in the systems mentioned above are generally complicated, expensive and bulky. Situations exist in which it would be convenient to make use of the high navigational accuracy obtainable from radio navigation systems but in which the cost and complexity of the receivers is prohibitive. Such applications are, for example, in plotting the changing positions of unmanned objects such as buoys or balloons and also for use in small boats or aircraft, or perhaps land vehicles. The problem is particularly onerous where there is a requirement to keep a fleet of small vehicles under surveillance. It would be very costly indeed to equip each vehicle of a fleet with a radio navigation receiver and related equipment.

Proposals have been made to provide, on the mobile, a simple radio relay transmitter effective to transmit information derived from received radio navigation signals for processing at a central station. For example, U.S. Pat. No. 3711856 describes in detail a relay system for Decca Navigator signals. Here, the multipulse Decca System employing five frequencies is described, the frequencies being 5F, 6F, 8F, 8.2F and 9F, where F is a fundamental common denominator to the four basic frequencies, usually about 14–15 kHz. Five filters divide the received signals into respective frequency channels where they are mixed with signals derived from a reference oscillator and the filtered modulation products are applied in parallel to modulate a communications transmitter. A multi-frequency parallel relay system of this kind is not suitable for accurate position determination. The reason is that for accuracy it is essential to preserve the relative phases of signals emanating from the different transmitters. However carefully parallel channels in the convertor at the mobile are constructed, they introduce phase errors in the signals since they have different phase delays. Furthermore, the radio transmitter link between the mobile and the central station, which link is shared by multiple-frequency transmitted signals, have different phase delays for the different frequencies and further relative phase errors are introduced.

A system for relaying Omega signals to a central station is proposed by Laughlin in U.S. Pat. No. 3,471,856. Another such system, but with more complex apparatus at the mobile, is described by Reed in U.S. Pat. No. 3,774,215. Although the Omega system is nominally one in which a single frequency is radiated in turn by a set of transmitters, at least two other frequencies are also radiated, for resolution of ambiguity. Thus, the Laughlin system is also a multifrequency parallel relay system and there is a consequent introduction of phase errors and loss of accuracy.

In U.S. Pat. No. 3,493,970 Knauth proposes a relay system for Loran signals. However, the Loran system is a pulsed system and not a continuous-wave system. Time-delays instead of phase differences are used and this means that a simple relay system would have to be of exceptional bandwidth to provide information of acceptable accuracy.

The present invention seeks to provide an improved and accurate relay system for radio navigation signals and is concerned particularly with a system in which at least three radio transmitters transmit signals of the same frequency $f_{rf}$ in fixed phase relation in a cyclic sequence, the frequency $f_{rf}$ being radiated from only one transmitter at a time. The invention provides, on the mobile, means for receiving the signals of frequency $f_{rf}$; a source of signals of frequency $f_o$; a mixer coupled to said receiving means and said source for mixing the $f_{rf}$ signals and the $f_o$ signals to produce heterodyne frequency signals of frequencies $f_{rf} + f_o$ and $f_{rf} - f_o$; filter means coupled to the output of the mixer for selecting a single frequency $f$, being one of the heterodyne frequency signals, where $f$ is an audio frequency; amplitude control means coupled to the filter means for ensuring that the amplitude of the $f$ frequency signals is substantially contant; a radio transmitter for transmitting on a carrier frequency, and modulating means coupled to the filter means and the radio transmitter for modulating the carrier with the $f$ frequency signals, positional information of the mobile being thus transmitted in the form of serial phase changes of the single frequency $f$ in a single transmission channel.

The amplitude control means is important to ensure that any amplitude/phase distortion in the transmission system does not affect the accuracy of the transmitted information, and is necessary in view of the fact that the $f_{rf}$ signals received from the different transmitters will generally be of different strengths owing to the different distances of the transmitters from the mobile. The amplitude control means may comprise an amplitude limiter arrangement in combination with the filter means or it may comprise an automatic gain control circuit. For fidelity of phase information transmission it is preferred that the modulator be a frequency modulator.

The source of $f_o$ signals may be a local oscillator at the mobile. In another embodiment of the invention, however, receiver means is provided at the mobile for receiving the $f_o$ signals which are transmitted by radio.

The apparatus installed on the vessel can be relatively small and inexpensive since it does not require the equipment for analysing the phase or time information of the signals and for displaying such information. The analysis can be effected at the central station, or alternatively the received signals can be recorded at the central station and analysed later, elsewhere if necessary. Alternatively, the signals may be partly analysed and recorded at the central station and finally analysed elsewhere. Analysis may be made by examining the converted signals themselves and operating on them in a computer, for example, having regard to the changes effected by the converter. Alternatively, the received converted signals may be reconverted to substantially their original form, the reconverted signals being applied to a conventional radio navigation receiver.

The system may be used as a guidance system, either automatic or with manual intervention, by feeding back to the vessel positional information derived at the central station.

When the position of a fleet of vessels is to be monitored by a central station it is envisaged that the converted signals from the different vessels may be transmitted in different channels of a frequency or time multiplex telemetry system. In particular, in a time multiplex system the central station may transmit interrogating signals to which the transmitters on the different vessels respond in turn to transmit their signals.

The equipment of the present invention may be used at long ranges from the radio navigation transmitters. The transmitters on the vessel may be of high power and long range. However, if the cost and size of the equipment is to be minimised then the transmitter on the vessel should be of low power and relatively short range. Thus, although the invention is applicable to virtually any range of operation its principal advantages will be felt if the range between the vessel and the receiving station is within about 50 miles. Thus, principal application for the invention is envisaged in off-shore operation or alternatively within a relatively limited range from a command vessel at sea, the command vessel having the receiving station.

A particularly suitable radio navigation system with which the invention may be used is the Decca Hi-Fix system which operates on a relatively high frequency. The system is extremely accurate. A similar system is the Decca Sea-Fix system. Both the Hi-Fix system and the Sea-Fix system make use of at least three radio transmitters radiating signals of the same frequency in fixed phase relation in a cyclic sequence, only one transmitter radiating at any one time.

Preferably the transmitter on the vessel is a conventional telemetry transmitter and the converter is such as to provide converted signals of suitable frequency for transmission in such a system. Typically, such signals should be in the low audio frequency range and a convenient converted frequency is about 2 kHz.

Instead of or in addition to, use with mobiles, the invention may be used to check the accuracy of a hyperbolic navigation system by arranging the converter and relay transmitter in a stationary reference station.

The invention will further be described with reference to the accompanying drawings, of which.

Figure 1:
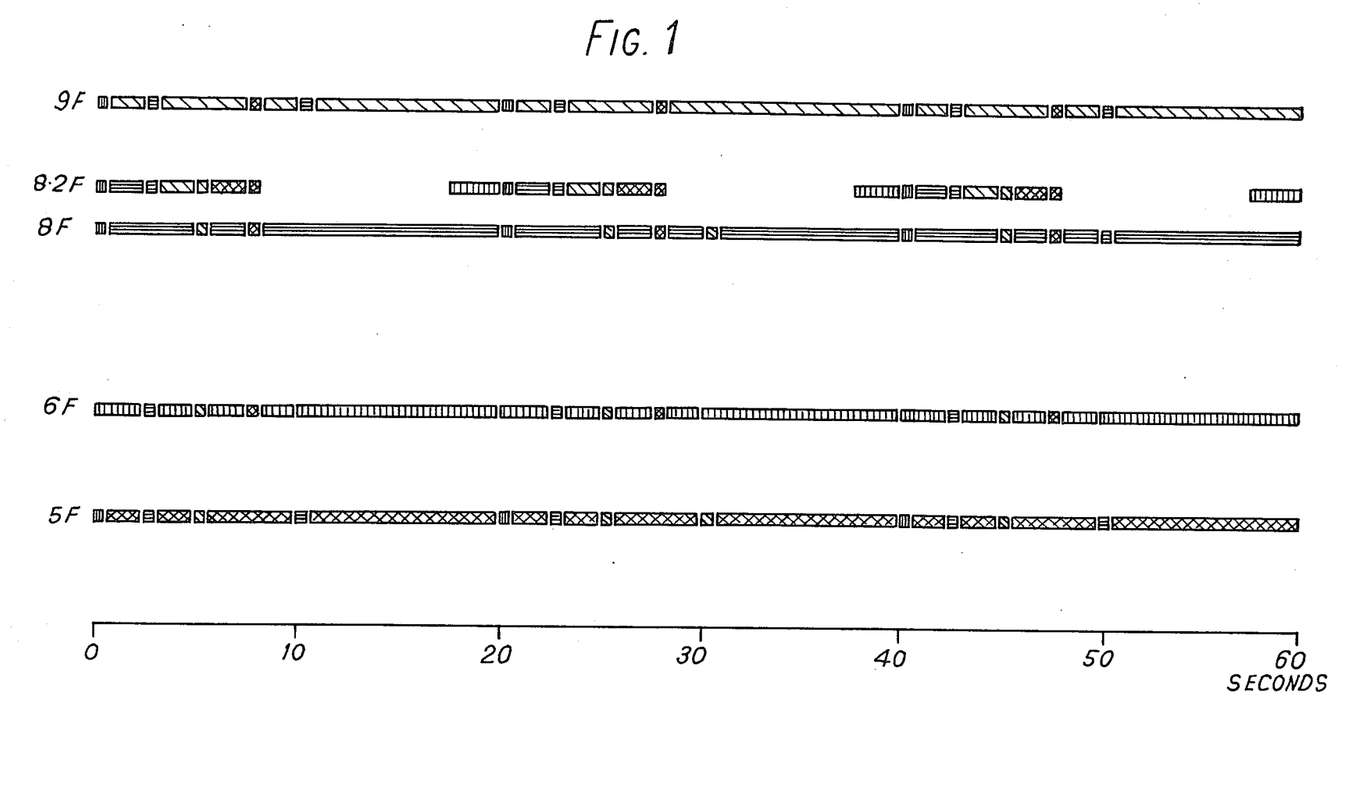
FIG. 1 is a diagram illustrating the transmission pattern for a multi-pulse Decca Navigator system.

Referring to FIG. 1 there is shown the cyclic pattern of radiations from the four transmitters of a Decca Navigator chain using the multi-pulse lane identification system. The chain comprises a master station and red, green and purple slave stations geographically separated (see FIG. 10). In FIG. 1 there is shown a complete transmission cycle of 60 seconds, it being understood that this cycle is repeated continuously. Signals of frequencies 6F (master), 5F (purple), 8F (green), 8.2F (orange) and 9F (red) are radiated as shown by the four stations whose transmissions are identified as follows:- master: vertical shading; red slave: horizontal shading; green slave: oblique shading; and purple slave: cross-hatching. The frequency F in this example is 14.166 kHz.

It will be seen that the master station transmits mostly at 6F; the red slave mostly at 9F; the green slave mostly at 8F and the purple slave mostly at 5F. These are the basic frequencies which are conventionally used for phase comparisons to determine position. However, the multi-pulse lane identification system requires that periodically and in turn all the transmitters except one shut off for a short period and during that period the remaining transmitter transmits all the frequencies. Thus, at 20 second intervals beginning at the start of each 60-second cycle, the master station transmits all the frequencies for half a second. 2½ seconds later the red slave transmits all the frequencies. 2½ seconds after this the green slave transmits all the frequencies and 2½ seconds later the purple slave transmits all the frequencies.

It will be seen that as far as any particular one of the five frequencies is concerned it is transmitted in turn in cycle sequence by the four transmitters, and when any particular transmitter is transmitting that frequency the others are not. Thus it is possible, in contrast to conventional practice, to determine position by reference to serial phase changes of a single received frequency instead of by reference to the relative and parallel phase changes of selected pairs of frequencies. Thus, Decca Navigator information can be relayed by a simple relay transmitter at a mobile which has a receiver tuned to only one of the transmitted frequencies and which retransmits a single audio frequency as a modulation of a carrier over a single channel. Phase errors introduced by the relay system are thereby minimised.

Figure 2:
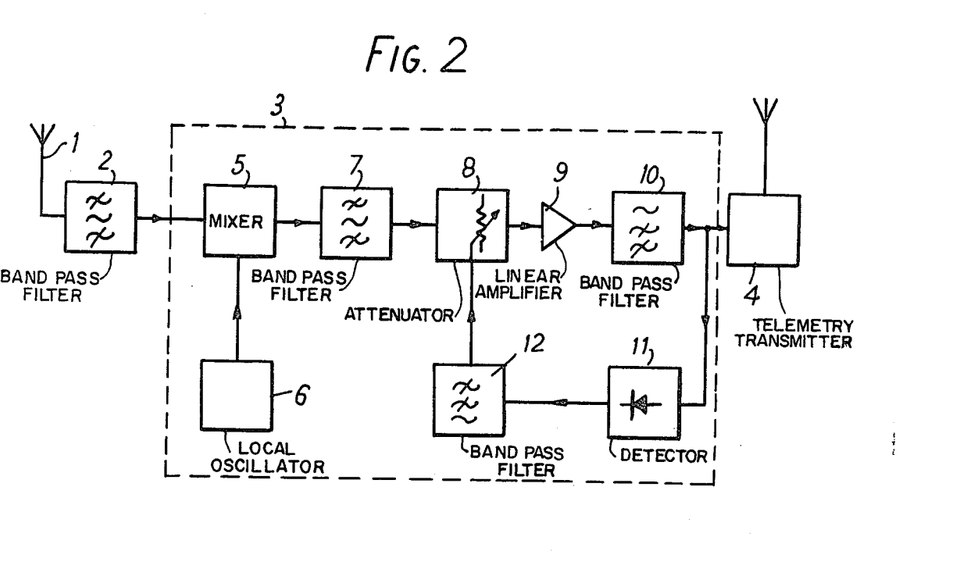
FIG. 2 is a block diagram of equipment for use in accordance with one embodiment of the invention for installing on a vessel whose position is to be determined.

Referring to FIG. 2 the equipment shown is for mounting in a vessel, for example an unmanned buoy, the position of which is to be plotted at a remote station. A typical application for such a buoy is in determining tidal effects by allowing the buoy to drift and plotting its position continuously.

The equipment comprises a receiving aerial 1 which feeds a radio frequency band-pass filter 2. The filter 2 is tuned to accept the "red" 9F Decca signals of frequency 127.5 kHz. The aerial 1 and band-pass filter 2 comprise a radio receiver. The filter 2 may include an active amplifier stage, although this is optional. The active amplifier stage matches the aerial and the mixer and has a pass-band of about 250 Hz. The output from filter 2 is applied to a converter 3 which, from the input radio frequency $f_{rf}$ produces an output frequency of f which is a converted signal containing the phase relationship of the components of the "red" signal at a frequency of about 2 kHz. This converted signal is applied to a telemetry transmitter 4 where it is modulated and transmitted to a receiving station (not shown). The transmitter 4 is a frequency-modulated 100 mW. transmitter operating in the 450 to 470 MHz. low power telemetry band. At the receiving station the signal is processed and the phase information extracted to determine the position of the vessel.

The converter 3 comprises a mixer 5 which receives the output from filter 2 and an output from a crystal-controlled local oscillator 6 having an output frequency of (in this example) 125.5 kHz. This oscillator has a short-term phase stability of about 1 in $10^9$ over 1 second and a long-term frequency stability of about 5 in $10^7$. The output from mixer 5 contains components equal in frequency to the sum and difference of the two inputs to the mixer and a band-pass filter 7 is provided tuned to pass the required output frequency of 2 kHz. and with a pass bandwidth of about 250 Hz. The audio signal from filter 7 is applied to a variable attenuator 8 and thence to a linear amplifier 9 and a high-pass filter 10. The output from filter 10 is applied to the transmitter 4.

In order to reduce excessive amplitude variations in the signal which might, because of non-linearity in the system, give rise to phase distortion, there is provided an automatic gain control feedback loop comprising a detector 11 which receives the output from high-pass filter 10 and a low-pass filter 12 which receives the output from the detector. The output from the low-pass filter controls the variable attenuator 8.

In the automatic gain control loop the variable attenuator is a linear device which contributes negligible noise, has a dynamic range of about 70 dB and a differential phase distortion of less than 1° for full range. The amplifier 9 is a linear amplifier and effects no limiting. It has low differential phase distortion. The combination of low-pass and high-pass filters, linear amplifier and attenuator has a gain of less than unity at all frequencies and the low-pass filter band width is high enough to permit rapid automatic gain control response. In particular, it is rapid enough to respond to the changes from the signal from one Decca station to that from the next, which, because of transmission path differences, will usually be of different amplitudes.

The arrangement of FIG. 2 is equally applicable to any of the other frequencies of the Decca Navigator system, including the "orange" 8.2F. Also, the arrangement is applicable to the Decca Hi-Fix system which operates at a frequency of about 2 MHz. In the Hi-Fix system there is a master station and two slaves all of which radiate the same frequency in turn. In one example the Hi-Fix frequency is 1901.053 kHz. In order to produce a frequency $f$ of 2kHz the local oscillator 6 then gives an output of 1903.053 kHz. In addition, in the Hi-Fix system there is a trigger pulse at the beginning of each cycle. This is a pulse of 60 Hz difference in frequency from the Hi-Fix frequency. It is convenient to use this synchronising burst at the central station in order to assist in decoding, since the transmitting stations can then easily be identified. To this end, the single audio frequency carrying the phase information is augmented by synchronising bursts of 2.060 kHz. and the filter 7 is tuned accordingly.

Figure 3:
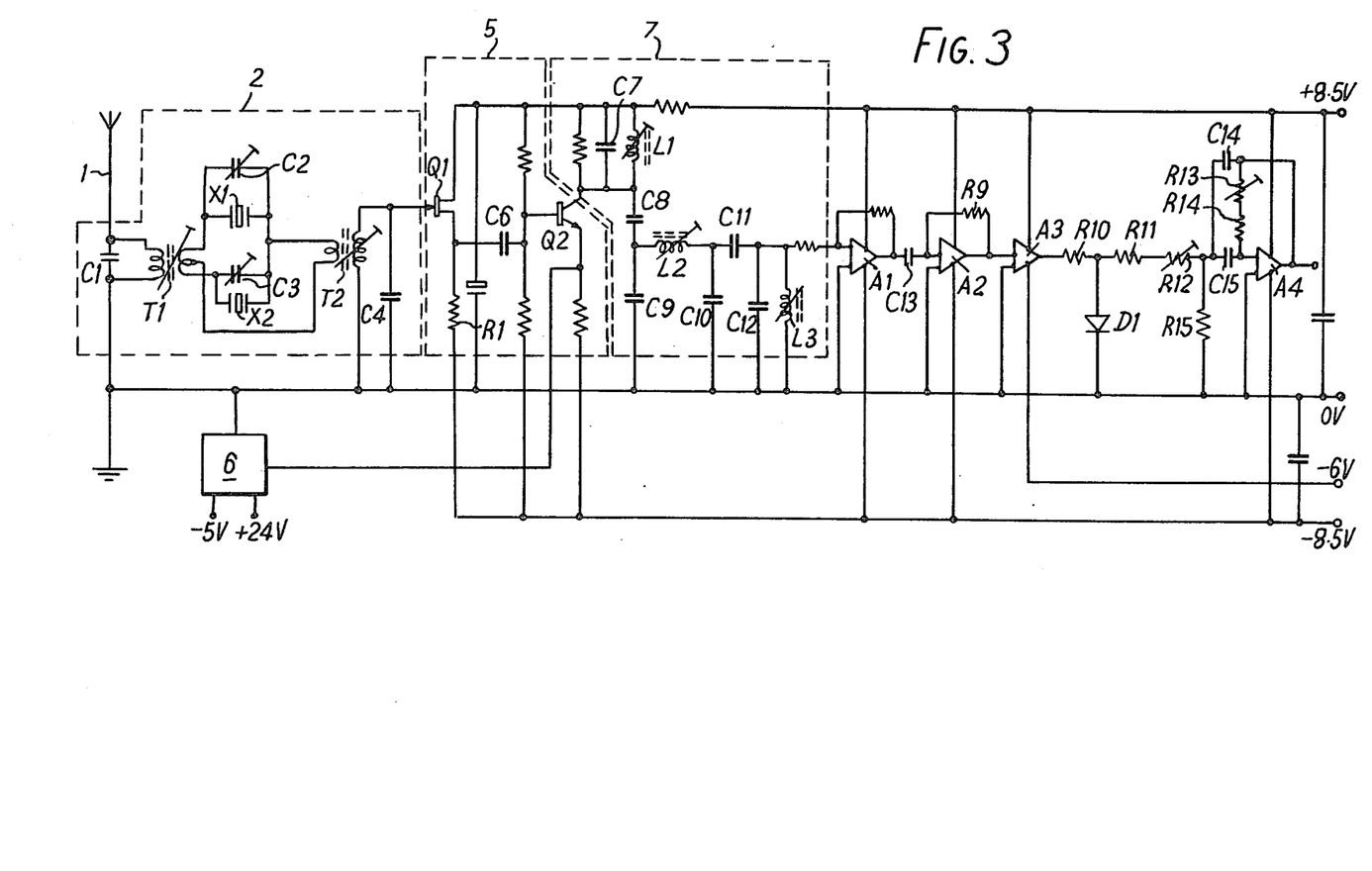
FIG. 3 is a circuit diagram of signal frequency conversion equipment for use in accordance with one embodiment of the invention.

Referring now to FIG. 3 there is shown a circuit of a signal frequency converter which performs the function of the converter of FIG. 2. There are many similarities in the circuits of FIGS. 2 and 3 and the same reference numerals will be used where appropriate. However, there are certain differences and the converter shown in FIG. 3 is a preferred embodiment of the invention. The embodiment of FIG. 3 uses a Decca Sea-Fix navigation system which is a modified version of the Hi-Fix system. In FIG. 3 the receiving aerial 1 applies signals to the filter 2 tuned to the Decca Sea-Fix frequency of (in this embodiment) 1917.000 kHz. Filter 2 comprises two tuned transformers C1, T1 and T2, C4 coupled by a half-lattice crystal filter T1, X1, X2, T2. Crystals X1 and X2 may be adjusted by capacitors C2 and C3. The −1db bandwidth of the filter is 250 Hz.

The mixer 5 comprises a field-effect transistor Q1 which presents a high input impedance to signals from the filter. Output from across a resistor R1 is applied to the base of a modulating transistor Q2 through a capacitor C6. The output from oscillator 6 is applied to the emitter of transistor Q2 and the resultant modulated output is applied to the band-pass filter 7. Filter 7 comprises capacitors C7 to C12 and coils L1, L2 and L3. The filter has a −1db bandwidth of 250 Hz. centred on 2.030 kHz.

Oscillator 6 is temperature controlled, being mounted in an oven enclosure including an electric heater deriving power from a 24 volt supply. The oscillator incorporates a frequency-dividing circuit powered by a 5 volt supply to give the desired output frequency of 1919.000 kHz.

An amplifying stage comprising amplifier A1 feeds a limiting stage comprising amplifiers A2 and A3 and a diode D1. Capacitor C13, resistor R9 and amplifier A2 form a virtual-earth amplifier having controlled gain and phase-shift at 2.000 kHz. The time constant R9, C13 is 1.5 msec. This is short with respect to the rise-time of the signals limited by the audio-frequency and high-frequency filters A3, R10 and D1 form a limiting amplifier. The signal across D1 is constant to within ±3 db in amplitude in practice for a 60 db range of input signals.

There is provided an output band-pass filter comprising resistors R11 to R15, capacitors C14 and C15 and amplifiers A4. The filter is centred on 2030 kHz. with a −3db bandwidth of approximately 500 Hz. This serves to restore the fundamental component of the waveform present across D. R12 adjusts the voltage output. R13 adjusts the centre frequency of the filter.

It will be seen that the embodiment of FIG. 3 employs a limiter-filter rather than an automatic gain control loop comprising a variable attenuator, band-pass filter, detector and low-pass filter as shown in FIG. 2. In principle the limiter-filter comprises a limiting amplifier and a band-pass or low-pass filter. The limiting amplifier serves to produce an output substantially independent in level of the input amplitude. The amplifier may be a simple comparator amplifier, or it may have the diode limiter at the output as shown. Alternatively, a non-linear transfer function may be employed in a feedback path to give an approximately logarithmic output/input characteristic. As with the automatic gain control loop, it is important that the operation of the limiting amplifier does not introduce more than a few degrees of phase shift with changes of input amplitude. A typical specification is a range of 7° of phase shift for 60 dbs of input variation.

The limiter is followed by a filter which serves to reduce substantially the harmonic component of the limited waveform. The fundamental component is passed. This filter is of particular importance if a comparator amplifier is employed for, if this amplifier produces a rectangular waveform output which does not have 1:1 mark: space ratio the harmonics will suffer severe phase shift. However, the fundamental component of the distorted waveform has the same phase as the fundamental component of a waveform with 1:1 mark: space ratio.

Figure 4:
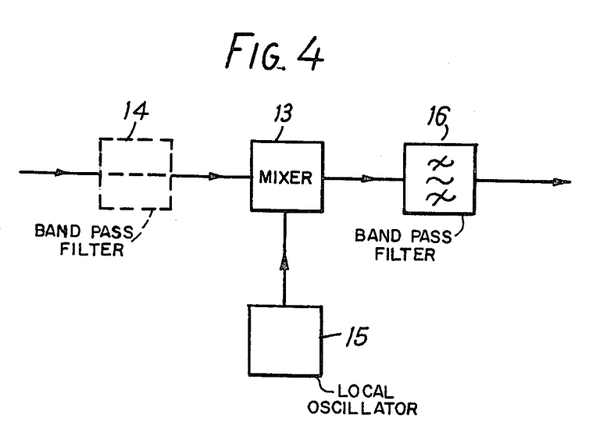
FIG. 4 is a block diagram of re-converter equipment for use in a system or method in accordance with the present invention.

Referring now to FIG. 4 there is shown a converter which may be used, perhaps at the receiving station to restore the signals transmitted from the converters on the vessels to substantially the form received at the vessels. After radio reception of the telemetry signal the audio frequency input is applied to a mixer 13, perhaps through a band-pass filter 14 tuned to pass the 2 kHz. signals which are mixed in the mixer 13 with the output $f_o$ from a crystal-controlled local oscillator 15 at 1919.000 kHz. The output from mixer 13 is applied to a band-pass tuned to the Sea-Fix frequency of 1917.000 kHz. The output from filter 16 is the reconstituted Sea-Fix signal with the phase relationships as received at the vessel and may be applied to a conventional Sea-Fix receiver and position plotter.

When a single-frequency Decca Navigator signal is being used the same principle for de-modulation and re-conversion as illustrated in FIG. 4 may be used. However, since the received signals are not conventional multi-frequency signals, a conventional Decca Navigator receiver is not used. Instead, there is provided a de-coder which operates on similar principles to the Decca Hi-Fix and Sea-Fix decoders. This involves a form of decoding and storage of the phase information from the different serial parts of the incoming signal so that phase comparisons can be made and positional information derived.

For such decoding and phase comparison as mentioned above to be effective it is necessary to be able to identify the phase information in the incoming signal corresponding to different transmitters. Some form of synchronization is required. This is the purpose of the synchronizing bursts at 2.060 kHz mentioned above in the case of Hi-Fix and Sea-Fix transmissions. For Decca Navigator single-frequency transmissions it will be seen that the stations can be identified by reference to the phase-change times in the 20-second periods of the 60-second cycle. Each cyclic transmission of pulses lasting ten seconds transmits pulses from the transmitters in the following order: master; green slave; red slave; purple slave. Thus, the stations can be identified. Alternatively, in any of the systems a master receiver at the central station operating in a conventional manner and responsive to the navigation transmitters can be used to generate timing signals to the decoder in accordance with the timing of the station transmissions, thereby allowing station identification in the decoded information.

The above-described embodiment of the invention is not limited to the details described. For example, the mixer 5 may alternatively be a balanced mixer or a sampling gate (with hold facility) operating at $f_o$ or a sub-harmonic of $f_o$.

Figure 5:
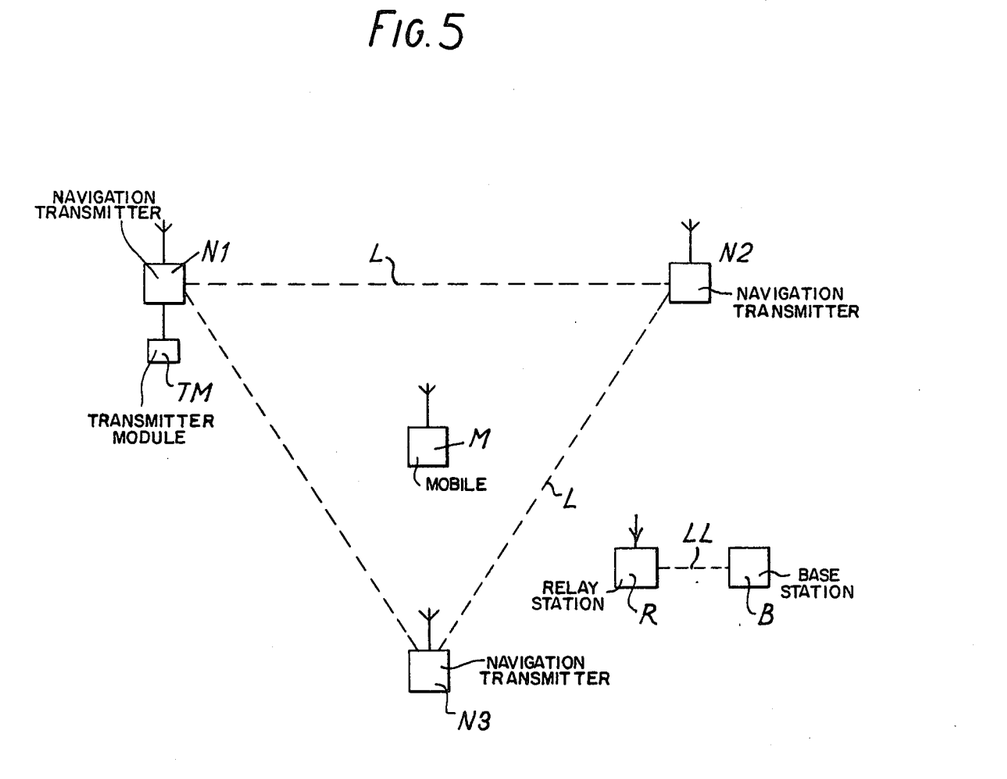
FIG. 5 is a schematic diagram illustrating another system in accordance with the invention.

Referring now to FIG. 5 there is shown a system in which the $f_o$ signal is not generated locally but is transmitted by radio to the mobile. The system comprises three navigation transmitters N1, N2 and N3 phase-locked by links shown schematically at L to transmit phase-related navigation radio signals at a frequency $f_{rf}$. Transmitter N1 is the master transmitter and transmitters N2 and N3 are slave transmitters. The arrangement is such that a hyperbolic phase pattern is established in the region between and surrounding the transmitters. A mobile M receives signals at frequency $f_{rf}$ which are phase related in a manner dependent upon the position of the mobile in the area.

The system also includes an $f_o$ transmitter module TM associated with transmitter N1 and coupled with the other transmitters N2 and N3 by links L. This arrangement is effective to ensure that the transmitters transmit the navigation signals and signals at a frequency $f_o$ in predetermined sequences to be described. The transmitted $f_{rf}$ and $f_o$ signals are received by mobiles such as M in the area which include a converter to convert the signals and a relay transmitter which transmits the converted signals over a conventional telemetry radio link to a receiver station R. Station R is a relay station which transmits the received signals over a land line LL to a base station B, where the signals are analysed by a computer to track the mobiles in the area.

Instead of being used to track mobiles, or only to track mobiles the system may be used to check the accuracy of the hyperbolic navigation pattern. For this purpose, the mobile M of FIG. 5 will be fixed and will be a reference station. The converted signals from the reference station M will be received at the receiving station R and analysed to give the apparent position of the reference station. The difference between the apparent position and the actual position of reference station is due to propagation errors, which can thus be determined and compensation can be made.

Figures 6, 8:
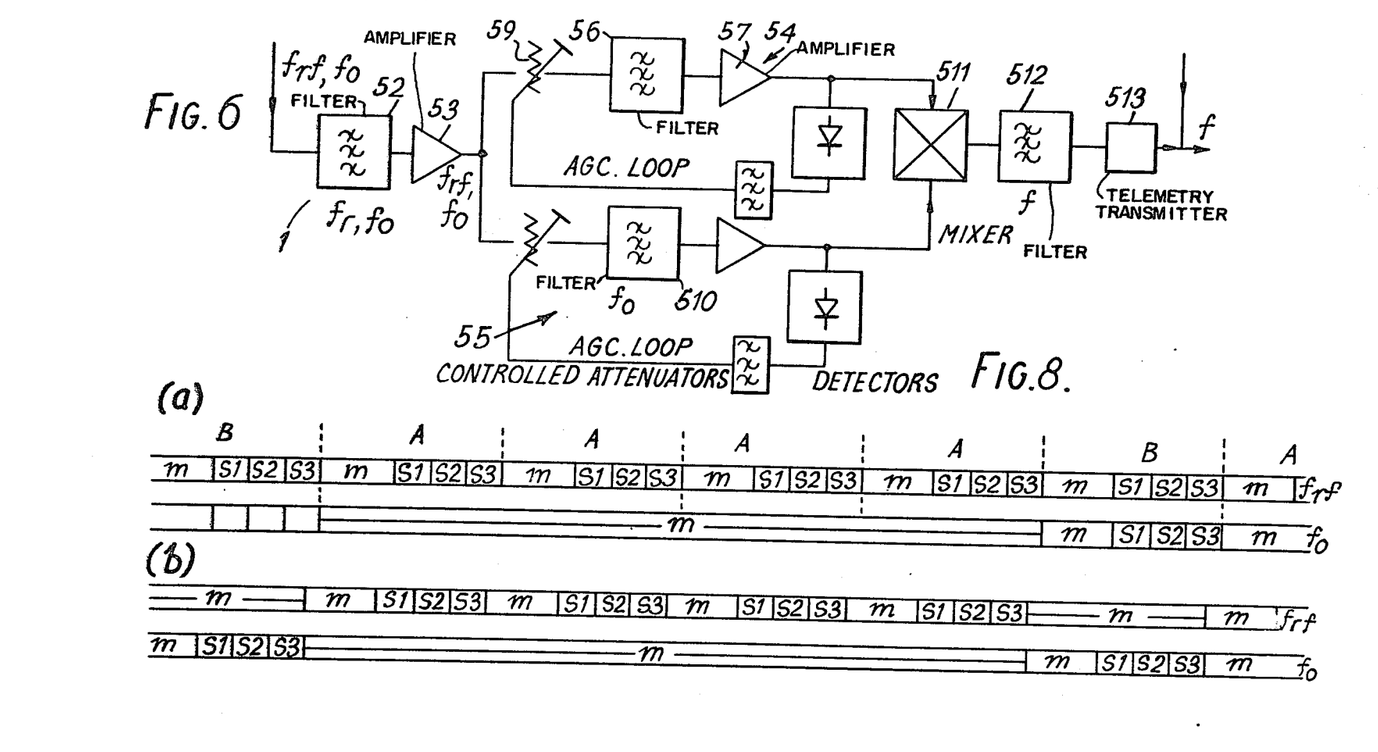
FIG. 6 is a block diagram of apparatus for use in a system in accordance with the invention for inclusion on a mobile.
FIG. 8 is a transmission mode diagram illustrating at (a) and (b) two alternative transmission modes for a system in accordance with the invention.

Referring to FIG. 6 there is shown apparatus for inclusion on the mobile, which may be a water vessel such as a buoy or boat, an air vehicle such as an aircraft or balloon, or a land vehicle. The apparatus comprises a radio receiver 5 which receives the radio navigation signals at the frequency $f_{rf}$ and the signals at the frequency $f_o$. The receiver includes a filter 52 which passes signals of frequencies $f_{rf}$ and $f_o$ and an amplifier 53 which amplifies the filter output. The amplifier output is divided to two parallel paths 54 and 55. Path 54 includes a filter 56 which selects frequency $f_{rf}$ and an amplifier 57. The output from amplifier 57 is applied to an automatic gain control detector 58 which applies feed-back signals to a device 59 which controls the gain of path 54.

Path 55 is similar to path 54 except that it carries $f_o$ signals instead of $f_{rf}$ signals, the filter 510 in path 55 being tuned to $f_o$.

The $f_o$ and $f_{rf}$ signals are mixed in a mixer 511 to give a converted signal of frequency $f$ which passes through a filter 512. The converted frequency $f$ is transmitted to a receiving station by means of a frequency modulated radio telemetry transmitter 513 operating in the 450 – 470 MHz low-power telemetry band.

Figure 7:
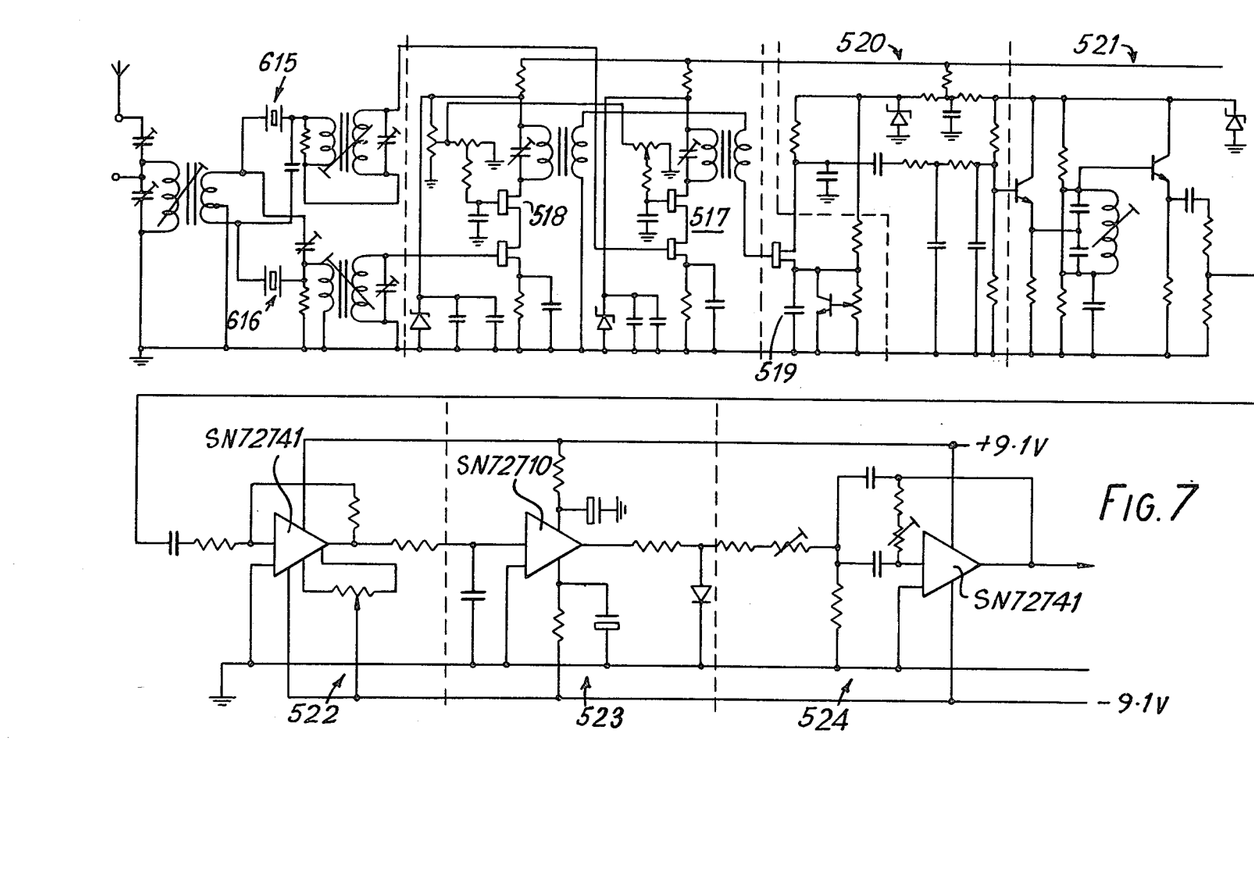
FIG. 7 is a circuit diagram of further apparatus for use in a system in accordance with the invention for inclusion on a mobile.

Referring now to FIG. 7 there is shown, in more detail, an alternative arrangement for the receiver and converter in the mobile. The receiver comprises input filters 615 and 616 set at 72 kHz and 70 kHz respectively. These filters feed respective amplifiers 517 and 518 which in distinction to the amplifiers of the FIG. 6 arrangement, do not have automatic gain control. The outputs from amplifiers 517 and 518 are mixed in a mixer 519 the output from which is applied to a low-pass filter 520 followed by a band-pass filter 521 set at 2 kHz.

The output from filter 521 is applied to first and second limiter stages 522 and 523 respectively and the output from stage 523 is applied to an active band-pass filter 524 which passes the signals at frequency $f$, namely 2 kHz in this example. The output from filter 524 is applied to a telemetry transmitter such as 513 of FIG. 6.

The signal at $f$ is a replica of that received at $f_{rf}$ in that the relative phase of the three time-sequenced signals from three transmitters are preserved. The frequency $f_o$ is chosen to be close to $f_{rf}$, resulting in a low frequency $f$. In this example the frequencies are:-

$f_{rf} = 72$ kHz
$f_o = 70$ kHz
$f = 2$ kHz

Two transmission modes are possible.

A. One station transmits at frequency $f_o$, and each station transmits at frequency $f_{rf}$ in turn, with a predetermined phase relationship. The time-sequenced signals at $f$ may be phase-compared, to yield position-within-lane information on a hyperbolic grid at frequency $f_{rf}$. That is, the lane width on each baseline is a half wavelength at $f_{rf}$.

B. Each station in turn transmits at frequencies $f_o$ and $f_{rf}$ simultaneously, the difference frequency $f$ being in a predetermined phase relationship. The converter again produces a time-sequence of signals at $f$ which may be phase compared. However, the position-within-lane information now relates to a coarser hyperbolic grid at frequency $f$ having a baseline lane width equal to a half wavelength at $f$.

It is proposed that the transmission format be such that pattern A and pattern B are transmitted in turn, perhaps alternately or perhaps with pattern A transmitted for a high duty cycle and B occasionally, say 4:1, or perhaps with pattern B transmitted for a high duty cycle and pattern A occasionally.

FIG. 8 shows at (a) the transmission of fine and coarse patterns in turn, the transmission times for frequencies $f_{rf}$ and $f_o$ being shown from master station m and slave stations S1, S2 and S3.

An alternative to transmitting fine and coarse patterns is to transmit fine patterns on the two frequencies (FIG. 5 (b)). Lane identification is again possible by measurement carried out at the difference frequency. In the Hi-Fix (and in Hi-Fix 6) system lane identification is achieved by the use of two frequencies and common station locations, differencing being carried out after phase measurement, whereas in this embodiment of the invention, the frequencies are mixed in the converter, and measurements made at frequency $f$.

Figure 9:
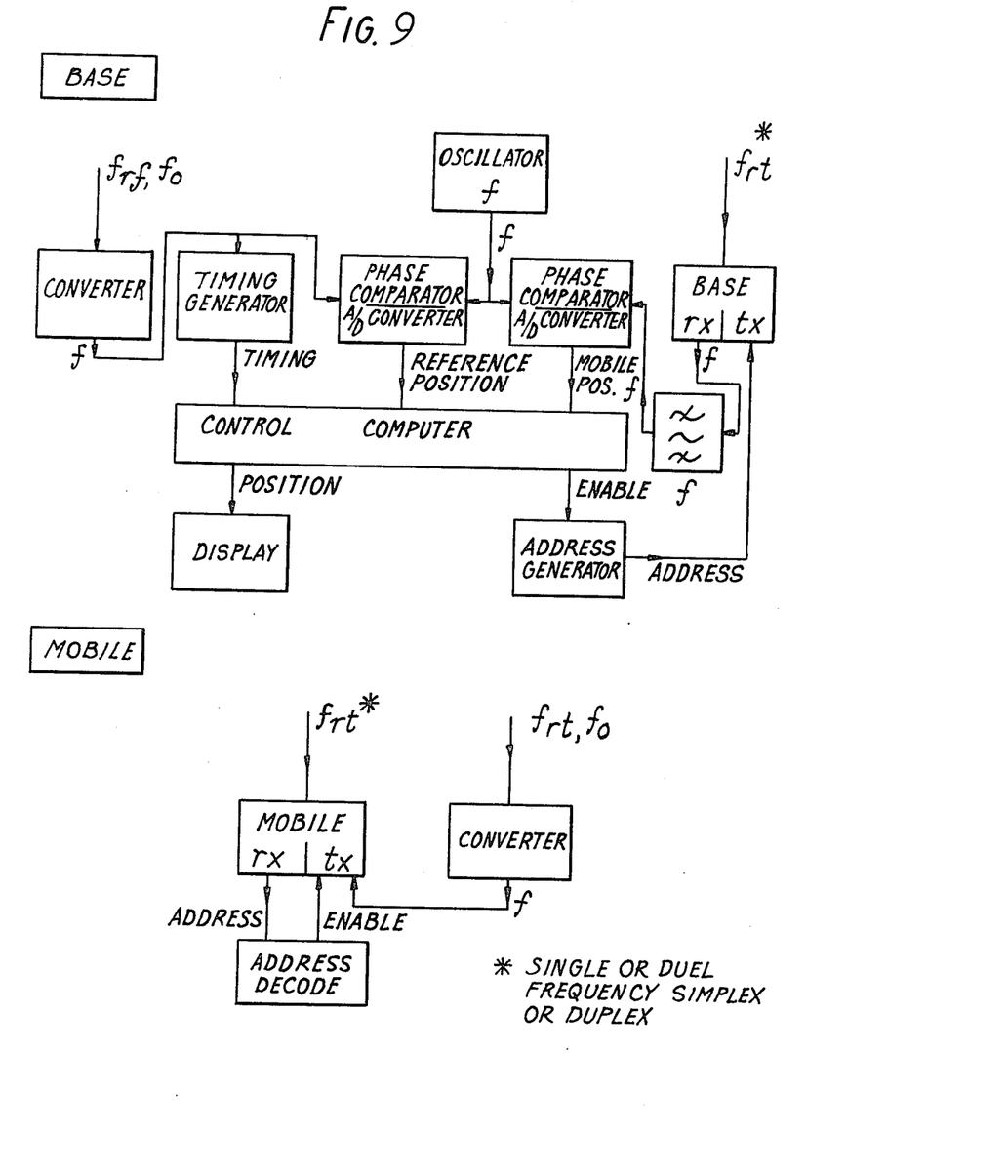
FIG. 9 is a block diagram illustrating the apparatus at the base and on a mobile for a vehicle locating and tracking system embodying the invention.

The two-frequency radio navigation relay system has been devised and is proposed as a solution to the problem of surveillance of fleets of mobile units such as police, fire and other public service vehicles. FIG. 9 shows a comprehensive vehicle-monitoring system which would utilise the existing vehicle radio-telephone, whether the vehicle is manned or not.

FIG. 9 shows the arrangement of components at the base and at a mobile. At the base there is a converter similar to that at the mobile which receives the $f_{rf}$ and the $f_o$ signals and which provides an $f$ signal which is used as a reference representative of the position of the base. This signal is applied to a phase comparator which also receives a reference signal at frequency $f$ from a local oscillator. The two signals are phase compared and the result is converted to digital form in an analog-to-digital converter and applied as a reference position input to the computer. Timing signals are derived from the $f$ frequency output from the converter at the base. These signals synchronize a timing generator which applies timing control signals to the computer.

At appropriate times the computer enables an address generator to generate an interrogating address which is applied to the radio-telephone transmitter and transmitted. The address is received by all mobiles having their radio-telephone appropriately tuned but each mobile has an address decoder and only when the address appropriate to the particular mobile is received, will the address decoder respond and enable a position transmission to be made by the telephones. The converter at the mobile receives the $f_{rf}$ and $f_o$ signals and generates an $f$ signal representative of the mobile position. When the radio telephone transmitter is enabled to transmit, the $f$ signal is transmitted by modulation of the radio telephone carriers.

The radio telephone signal is received at the base and is demodulated and filtered to give the $f$ signal. This is phase-compared in a phase comparator with the output from the $f$ frequency oscillator and the resultant mobile position signal is converted to digital form in an analog-to-digital converter and applied to the computer. The computer effects a comparison between the position signals for the base and the mobile gives a display of the mobile position relative to the base. The radio telephone may operate on single or dual frequency simplex or duplex.

The system would most advantageously, but not necessarily, operate under the control of a computer. The sequence for determining the position of vehicles is as follows: each vehicle in turn is caused to relay a master + slaves sequence of position information. The sequence received at the base station is phase-compared with a precision reference oscillator and the values of the relative phases (master-reference, slave 1-reference etc.) are measured then fed to and stored by the computer. The position of the vehicle is calculated and corrections applied for propagation errors as indicated by reference position receivers located at the base station or other known fixed points.

The computer is able to determine the position-in-lane of the vehicle on either the fine A or the coarse B pattern provided that the vehicle transmits during the appropriate part of the sequence. It is anticipated that vehicles would have their positions set initially by a combination of fine and coarse pattern measurements, plus, possibly, a very coarse manual entry to eliminate the ambiguities of position within the coarse pattern.

Each vehicle is made to transmit for an appropriate period in the sequence by addressing or by time-slot operation. Hereinafter a single navigation transmission (e.g. master fine) is called a bit, a set of transmission (e.g. fine pattern) is a word and a roll-call of vehicle is a group.

Addressing

The computer generates and transmits an address unique to a vehicle which is received and recognised by the mobile equipment. The system is flexible in that (a) vehicles which are detected as being in movement may be interrogated more frequently than stationary vehicles; (b) non-operational mobiles need not be included in the roll-call, permitting more frequent position updating of the rest; (c) the computer can interrogate vehicles during coarse and/or fine transmissions as required. For example, a fast-moving vehicle might be plotted only on the coarse grid. This would permit longer periods between updates (and hence more mobiles in the system). (d) Vehicles may be reinterrogated if incomplete or suspect responses are received.

Time-Slot Operation

A group

A synchronizing signal is transmitted to all mobiles to indicate the start of a roll-call. Each vehicle has a pre-assigned time-slot order. Then either:

(a) vehicle synchronizing signals are transmitted, each mobile unit counting until its own integral number is recognised; or (b) the group synchronizing signal starts (or locks) a clock in the mobile unit which generates a pre-programmed delay, then initiates a command. Errors in the clock lead to variations of timing proportional to the delay, but these can be made insignificant (compared to the tolerance on group synchroniozation) without the use of a very expensive oscillator. 1 in $10^5$ stability would give an error of 1 msec. in a 100 sec. group period.

Synchronizing Channel

The addressing or synchronizing information may be transmitted to the mobiles either:

(a) via a vhf/uhf channel, possibly an existing voice channel, paired with the vehicle transmission channel; or (b) by including it in the navigation transmission.

The first solution gives greater flexibility. It is probable that many groups of vehicle will use a common navigation transmission and vehicles transmission periods can be controlled within each group without affecting other users.

The second solution has the advantage of freeing the base-to-vehicle channel for other uses.

The maximum value of $f$ is set by the upper frequency limit of the telemetering channel. In many cases, this is 3 kHz. This sets the minimum coarse pattern lane width and separation of position ambiguities, as 50 km. If reliable phase measurement of $\pm 2$ centilanes (i.e., $\pm 0.02$ lane or $\pm 1$ km) can be achieved the minimum lanewidth for the fine pattern is 2 km. and the maximum value of $f_{rf}$ (half wavelength = 1 km) is 75 kHz.

A phase measurement resolution of $\pm 2$ centilane at 75 kHz corresponds to a maximum spatial resolution of $\pm 40$ m. This limiting resolution is only available in the baseline region of the pattern. The resolution is proportionately less if $f$ is reduced below 3 kHz. $f_{rf}$ below 75 kHz. or the phase-measurement resolution is worse than $\pm 2$ centilanes.

Errors arise from phase pattern perturbations caused by buildings and natural geographical features and from anomalies in the propagation velocities of signals at $f_{rf}$ and $f_o$. Sky-wave components also degrade the accuracy. Reflections of the signal (if telemetered at vhf or uhf) cause phase errors. It is possible, however, to minimise these errors:

(1) Errors due to skywave components and propagation velocities in a long-baseline system may be systematic over areas of several square kilometers. If fixed reference stations of the kind mentioned above at known locations are included within a multiplexed system, these errors may be measured and area corrections applied.

(2) Errors at frequency f due to reflections of the telemetered signal are eliminated if they are constant; position information is in the form of phase differences between timesequenced components. (This is not true of some alternative systems). Thus, only phase changes occurring at a rate comparable to the sequence rate are significant, and a maximum sequence rate should be employed, compatible with bandwidth and noise requirements.

The invention is not restricted to the details of the above-described embodiments thereof. For example, the converter may include any of the following modifications:-

Ahead of the Mixer

There is an arrangement permitting signals at two frequencies to flow to the mixer. There may be one or more amplifiers of fixed or variable gain and/or one or more fixed attenuators or variable attenuators. Both gain and attenuation could be requied, either coming before the other.

Generally there will also be one or more filters passing frequencies around $f_{rf}$ and around $f_o$ and stopping others. The filters may be adjustable, or components may be switched to change channels. The filters may be active or passive.

There may be more than two channels ahead of the mixer with switching to permit only two to feed the mixer at any time.

Mixer

The mixer might be any non-linear device: bipolar or field-effect transistor, p-n junction diode, thermionic diode, triode or pentode, Schottky-barrier diode. It might be a single device, pair (balanced or unbalanced), quad or ring modulator. Preferably the mixer should give only small changes of phase of the difference signal $f$ for low changes in the amplitude of $f_o$ and/or $f_{rf}$.

The signals at $f_o$ and $f_{rf}$ may be added together before the mixer or enter via separate ports (e.g., base and emitter circuits of bipolar transistor).

The device or devices constituting the mixer may have exact or approximate exponential or square-law or higher power law current/voltage characteristic.

Following the mixer

There will be one or more filters passing $f$ and rejecting $f_{rf}, f_o$ and other mixer products. Because $f$ is lower in frequency than $f_{rf}$ and $f_o$ and other products this may be a low-pass filter. Both band-pass and low-pass filters might be used.

There may also be fixed or variable amplifiers and/or fixed or variable attenuators.

Output amplitude range reduction within the converter may be achieved by automatic gain (or attenuation) control as in FIG. 3, or by limiting arrangement as in FIG. 4. One or more limiters may be used. These will usually, but not always, be followed by band-pass and/or low-pass filters to recover the fundamental (input) frequency.

One or more limiters and/or the controlled amplifiers and/or attenuators of automatic gain control loops may be placed either:

(1) within a single signal path ahead of the mixer;

(2) within one or each signal path to the mixer;

(3) after the mixer.

Alternatively, the mixer conversion gain may be controlled.

The signal controlling an automatic gain control loop may be derived from one or both signal paths ahead of the mixer or from after the mixer.

Figure 10:
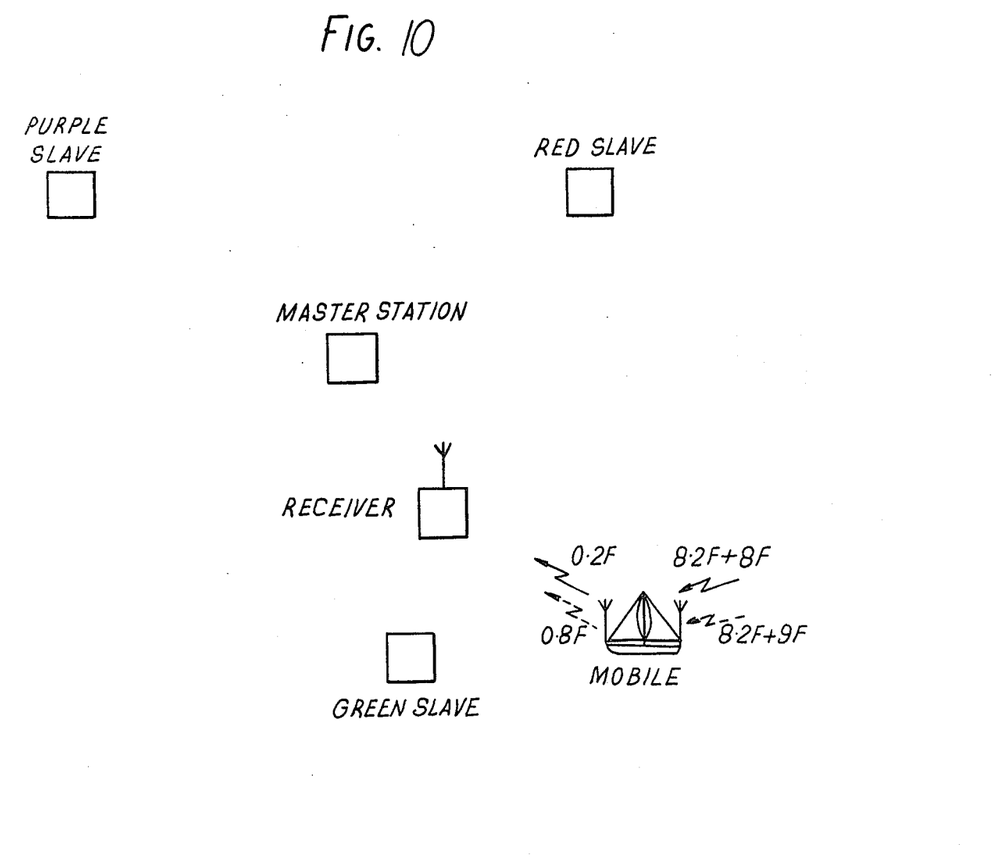
FIG. 10 is a schematic diagram illustrating use of the present invention in a Decca Navigator System.

Referring to FIG. 10 there is shown schematically a Decca Navigator System comprising a master station and red, purple and green slave stations. The sequence of transmissions from the stations is as described with reference to FIG. 1.

In a particular embodiment of the present invention advantage is taken of the close frequency relationship between the "orange" signals and the "red" or "green" signals, in order to allow the local $f_o$ oscillator to be dispensed with. Thus, the $f_o$ signal is derived from the orange transmissions and the system is analogous to the transmitted $f_o$ system described with reference to FIG. 4.

The receiver of the mobile is tuned to receive the red signals 8F and the orange signals 8.2F, treating them as the $f_o$ and $f_{rf}$ signals respectively. These signals are mixed in the converter and the difference frequency 0.2F is transmitted by the relay transmitter to the remote receiver where analysis and position plotting are carried out.

An alternative is also illustrated, where the mobile receiver is tuned to the green 9F signal as the $f_{rf}$ frequency and the orange 8.2F signal as the $f_o$ frequency. The signals are mixed to produce a frequency $f$ of 0.8F which is transmitted to the receiver for analysis and position plotting.

I claim:

1. A system for determining position by radio in which at least three radio navigation transmitters transmit signals of the same frequency $f_{rf}$ in fixed phase relation in a cyclic sequence, the frequency $f_{rf}$ being radiated from only one transmitter at a time; the system comprising at least one signal processing and transmitting means, on at least one mobile the position of which is to be determined, said signal processing and transmitting means having means for receiving the signals of frequency $f_{rf}$ a source of signals of frequency $f_o$; a mixer coupled to said receiving means and said source for mixing the $f_{rf}$ signals and the $f_o$ signals to produce heterodyne frequency signals of frequencies $f_{rf} + f_o$ and $f_{rf} - f_o$; filter means coupled to the output of the mixer for selecting a single frequency $f$, being one of the said heterodyne frequency signals, where $f$ is an audio frequency; amplitude control means coupled to the filter means for ensuring that the amplitude of the $f$ frequency signals is substantially constant; a radio transmitter for transmitting on a carrier frequency, and modulating means coupled to the filter means and the radio transmitter for modulating the carrier with the $f$ frequency signals, positional information of the mobile being thus transmitted in the form of serial phase changes of the single frequency $f$ in a single transmission channel to a central station, decoder means being provided at the central station whereby the said positional information is derived from the said phase changes.

2. A system as claimed in claim 1 wherein the source of signals at frequency $f_o$ comprises a local oscillator on the mobile.

3. A system as claimed in claim 1 wherein the source of signals at frequency $f_o$ comprises receiver means for receiving transmitted radio signals at frequency $f_o$.

4. A system as claimed in claim 1 wherein the $f$ signals are of a frequency substantially at 2 kHz.

5. A system as claimed in claim 1 wherein the amplitude control means comprises at least one limiter for limiting the amplitude of the $f$ frequency signals.

6. A system as claimed in claim 1 wherein the amplitude control means comprises an automatic gain control circuit for maintaining the amplitude of the $f$ frequency signals substantially constant.

7. A method of location of at least one mobile comprising: transmitting in a fixed phase relation in a cyclic sequence from only one radio navigation transmitter at a time among a set of at least three radio navigation transmitters located at known positions a radio signal at a frequency $f_{rf}$; receiving said transmitted radio signals at the mobile; generating a signal at a frequency $f_o$ for use at the mobile; mixing the signals at the frequency $f_{rf}$ and the frequency $f_o$ at the mobile to produce a signal at a frequency $f$, where $f$ is an audio frequency; transmitting by means of a radio transmitter the signal at the frequency $f$ from the mobile to a control station; and analysing the signals of frequency $f$ received at the control station to determine the position of the mobile.

8. A system as claimed in claim 1 wherein there are a plurality of mobiles and said system further comprises further signal processing and transmitting means, one for each mobile, and a multiplex means for causing said transmitters to transmit on a single channel of a multiplier transmission system.

9. A system as claimed in claim 8 wherein said multiplex means is a time-division multiplex system, signals being received from the mobiles in turn in response to interrogation, each mobile having a multiplex unit responsive to radio interrogation.

10. A system as claimed in claim 1 wherein the $f_o$ signal-generating means comprises one of the said navigation transmitters for transmitting $f_o$ radio signals and signals are transmitted in the sequence: one navigation transmitter transmits the $f_o$ signal and all navigation transmitters transmit the navigation radio signals at a frequency $f_{rf}$ in turn with a predetermined phase relationship.

11. A system as claimed in claim 1 wherein the $f_o$ signal-generating means comprises the said navigation transmitters for transmitting $f_o$ radio signals and signals are transmitted in the sequence: each navigation station in turn transmits at frequencies $f_o$ and $f_{rf}$ simultaneously, the difference frequency $f$ being in a predetermined phase relationship.

12. A system as claimed in claim 1 wherein the $f_o$ signal-generating means comprises one of the said navigation transmitters for transmitting $f_o$ radio signals and signals are transmitted alternately in first and second sequences, the first sequence being such that one navigation transmitter transmits the $f_o$ signal and all navigation transmitters transmit the navigation radio signals at a frequency $f_{rf}$ in turn with a predetermined phase relationship; and the second sequence being such that each navigation station in turn transmits at frequencies $f_o$ and $f_{rf}$ simultaneously, the difference frequency $f$ being in a predetermined phase relationship.

13. A system as claimed in claim 3 wherein the navigation transmitters comprise the transmitters of a navigation system operating at five frequencies, namely 5F, 6F, 8F, 8.2F and 9F, where F is substantially 14 kHz and the $f_{rf}$ signals and $f_o$ signals are those transmitted at 8.2F and 8F.

14. A system as claimed in claim 1 wherein the navigation transmitters operate at five frequencies, namely 5F, 6F, 8F, 8.2F and 9F, where F is substantially 14 kHz., the transmitters being arranged so that at spaced intervals all of the transmitters are silent except one which radiates all of the frequencies simultaneously, the particular transmitter which is radiating at a particular interval being changed in cyclic sequence, and the $f_{rf}$ signal is a selected one only of the 5F, 6F, 8F, 8.2F and 9F signals.

15. A system as claimed in claim 14 wherein the source of $f_o$ signals is a local oscillator at the mobile.

16. A system as claimed in claim 14 wherein the $f_{rf}$ signal is the 8F signal and the source of $f_o$ signals is a receiver tuned to the 8.2F signal.

17. A system as claimed in claim 14 wherein the $f_{rf}$ signal is the 9F signal and the source of $f_o$ signals is a receiver tuned to the 8.2F signal.

18. A system as claimed in claim 1 wherein the modulator means is a frequency modulator so that the $f$ frequency signals are frequency-modulated on the said carrier.

* * * * *